June 21, 1960
L. W. FABIAN ET AL
2,941,528
ANESTHETIC VAPORIZER
Filed Dec. 16, 1957
2 Sheets-Sheet 1
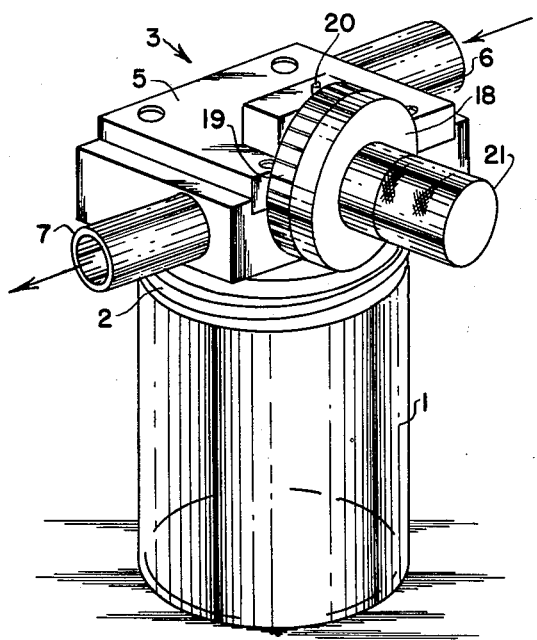
FIG.1
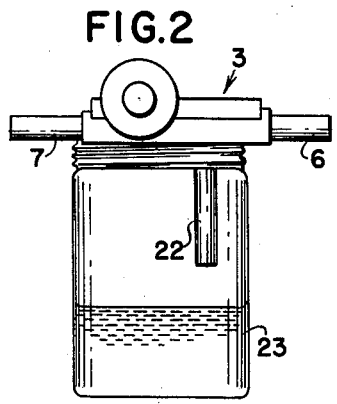
FIG.2
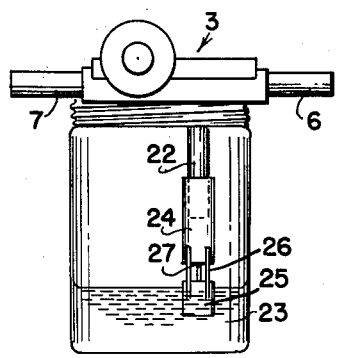
FIG.3
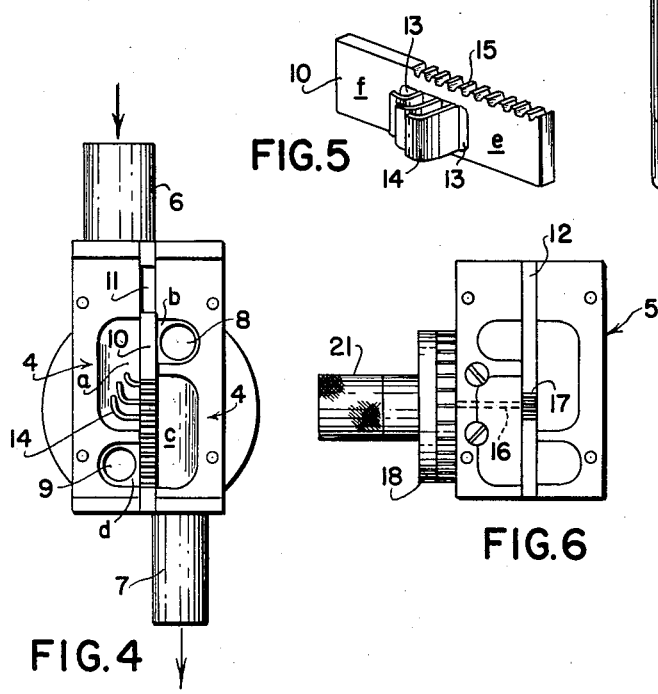
FIG.5
FIG.4
FIG.6
INVENTORS
Leonard W. Fabian
BY George W. Newton
ATTORNEY June 21, 1960 L. W. FABIAN ET AL 2,941,528
ANESTHETIC VAPORIZER
Filed Dec. 16, 1957 2 Sheets-Sheet 2

INVENTORS
Leonard W. Fabian
George W. Newton
BY Marston L. Hamlin
ATTORNEY

2,941,528
ANESTHETIC VAPORIZER

Leonard W. Fabian, 1818 Guess Road, and George W. Newton, 1306 Alabama Ave., both of Durham, N.C.

Filed Dec. 16, 1957, Ser. No. 702,919

8 Claims. (Cl. 128—188)

This invention relates to an anesthetic vaporizer. It is suitable for the administration of volatile liquid anesthetics but particularly for the administration of trifluorobromochloroethene, $CF_3 \cdot CClBrH$ ("Fluothane," I.C.I.), vapor diluted with air or other appropriate gas or gas mixture.

Many vaporizers of this general type have been disclosed and used in the past, but the present vaporizer is distinguished by simplicity of construction, simplicity of operation and accuracy of control.

It is an object of this invention to provide an anesthetic vaporizer which is simple and inexpensive to construct, to clean and to maintain and has the above mentioned characteristics of easy manipulation and accuracy of control.

The present vaporizer comprises a jar for containing the liquid volatile anesthetic, a vapor-tight cap on the jar, a valve chamber on the cap, a cover on the valve chamber, a first inlet duct leading from the exterior into the valve chamber, a first outlet duct leading from the valve chamber to the exterior, a second inlet duct leading from the valve chamber into the jar, a second outlet duct leading from the jar into the valve chamber, a proportioning slide valve in the valve chamber adapted to regulate and proportion the flow of gas through the first ducts and the second ducts, and adjusting means operable from the exterior to position the slide valve.

Various modifications of the general arrangement may be introduced as indicated below.

Preferred embodiments of the invention are disclosed in the drawings and following description, but these are intended to be illustrative only and not to limit the scope of the invention which is defined in the appended claims.

In the drawings, Fig. 1 is a perspective view of one form of vaporizer;

Fig. 2 is a side view of another form of vaporizer;

Fig. 3 is a side view of still another form of vaporizer;

Fig. 4 is a top view of the valve chamber of vaporizers of Figs. 1–3 with top removed and slide valve in position;

Fig. 5 is a perspective view of the slide valve removed from the valve chamber of Fig. 4;

Fig. 6 is a view of the bottom of the cover for the valve chamber of Fig. 4;

Figure 7:
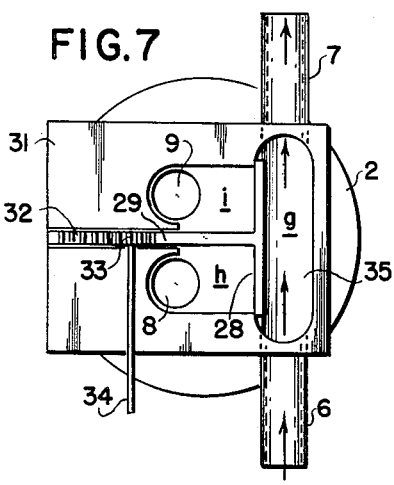
Fig. 7 is a top view of a valve chamber containing a modified slide valve with the cover removed.

In the drawings a jar 1, advantageously of glass, is closed at the top vapor-tight by a screw cap 2 on which is mounted the duct-and-valve assembly 3. This assembly comprises a valve chamber 4, a cover 5 for the valve chamber, a first inlet duct 6 leading from the exterior into the valve chamber, a first outlet duct 7 leading from the valve chamber to the exterior, a second inlet duct 8 leading from the valve chamber into the jar 1, a second outlet duct 9 leading from the jar into the valve chamber, a slide valve and regulating means for the slide valve.

A preferred form of slide valve 10 is illustrated in Figs. 4, 5 and 6. The valve 10 is movable longitudinally in slot 11 cut in the valve chamber body and in mating slot 12 cut in valve chamber top 5. Slide valve 10 is pierced by a window 13 in its mid portion and curved J-shaped baffles 14 are affixed to the inlet side of the window as shown in Figs. 4 and 5. These baffles are an important feature of our preferred device, since it has been found that by suitably adjusting their curvature, the shape of vapor-concentration curves 36 and 37, Fig. 9, may be altered as desired within the capacity of the apparatus.

The upper edge of the slide valve is provided with a rack 15 by which the position of the valve is regulated. Top 5 bears a rotatable arbor 16 on the inboard end of which is fixedly mounted a pinion 17 meshing with rack 15 in assembled position. The outboard end of arbor 16 is provided with an indexing drum 18 bearing indicia 19 by which, in relation to index mark 20, the position of valve 10 is shown. Drum 18 is also provided with a knurled finger extension 21 to facilitate adjustment.

From Fig. 4 it will be seen that valve 10 separates valve chamber 4 into four parts $a$, $b$, $c$ and $d$. The first inlet duct 6 leads into $a$, the second inlet duct 8 leads from $b$ into jar 1, the first outlet duct 7 leads from $c$ to the exterior, and the second outlet duct 9 leads from jar 1 into $d$. In Fig. 4 valve 10 is shown in one extreme position in which solid portion $e$ (Fig. 5) shuts off chamber portion $c$ from portion $d$ and solid portion $f$ shuts off chamber portion $a$ from portion $b$. Window 13, however, permits communication between chamber portions $a$ and $c$. Accordingly when valve 10 is in this position, all gas introduced through duct 6 will pass through $a$, 13, $c$ and 7, none entering jar 1. When the valve is in the opposite extreme position, solid portion $e$ cuts off communication between chamber portions $a$ and $c$, while window 13 opens communication between chamber portions $a$ and $b$; no part of valve 10 obstructs communication between chamber portions $d$ and $c$. All gas entering duct 6 will then pass into and out of jar 1 by way of 6, $a$, $b$, 8, 9, $d$, $c$ and 7. In intermediate positions, part of gas introduced through duct 6 will pass directly through the valve chamber and out through duct 7 and part will be diverted into and out of jar 1 through ducts 8 and 9 and will pass out of the apparatus through duct 7.

The gas that passes into and out of jar 1 will pick up vapor from the volatile liquid anesthetic in the jar, and the concentration of anesthetic vapor in the stream issuing from duct 7 will vary with the ratio of the stream diverted through the jar to the total gas stream. It is thus obvious that, within limits, this concentration can be controlled by manipulating finger extension 21, thus positioning valve 10 as desired.

Second inlet duct 8 may advantageously be continued part way into jar 1 by nipple 22 as shown in Fig. 2 to ensure circulation of gas over the surface of liquid 23 in jar 1.

To increase constancy of operation with falling liquid level as liquid 23 is consumed, the device shown in Fig. 3 may be employed. A telescoping tube 24 surrounds nipple 22 with a free slide fit. Tube 24 is supported on float 25 which is attached to tube 24 by wires 26 brazed or soldered to tube 24. Float 25 is made with sufficient buoyancy to support the lower end 27 of tube 24 a constant height above the level of liquid 23 and thus provide a constant aperture between tube 24 and the varying liquid level for gas circulating through jar 1. Since the gas circulated is under a very slight positive pressure, leakage around the top of tube 24 between it and nipple 22 is negligible and in any case is substantially constant.

Figure 8:
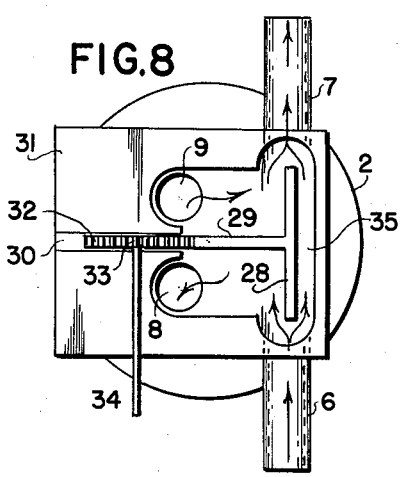
Fig. 8 is similar to Fig. 7 but with the slide valve in a different position.

An alternative form of slide valve is illustrated in Figs. 7 and 8 in two different positions. This valve is made in the form of a T, having a cross piece 28 and a shank 29, the shank sliding in groove 30 in the floor of valve chamber housing 31. The shank is provided with a rack 32 engaging pinion 33 fixed on arbor 34 which is rotatable by manipulation outside of housing 31. Such rotation moves valve 28—29 parallel to itself along groove 30.

In the position shown in Fig. 7, it will be seen that crosspiece 28 and shank 29 divide the valve chamber 35 into three portions g, h and i. In this position it will be obvious that, as shown by the arrows, all the gas entering duct 6 passes directly to duct 7 through chamber portion g, being excluded from chamber portions h and i and from ducts 8 and 9 by crosspiece 28. If the valve is moved part way to the right as seen in Fig. 8 and indicated by the arrows, part of the gas stream passes directly to duct 7 through chamber 35 and part is diverted into and out of jar 1 through ducts 8 and 9 and joins the main stream of gas through duct 7. If the valve is moved to the extreme right hand position, it will be seen that shank 29 cuts off direct access from duct 6 to duct 7 through chamber 35, and the entire gas stream will be diverted through the jar. This type of valve will thus function as an adjustable proportioning valve as does valve 10.

When used for anesthesia, our vaporizer is connected by duct 6 to any suitable device for administering gas for anesthesia and by duct 7 to a suitable face mask or other breathing device.

Figure 9:
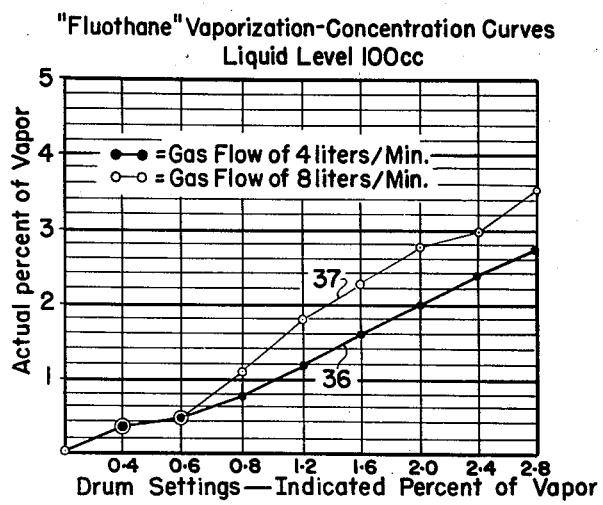
Fig. 9 is a graph illustrating vapor delivery from our vaporizer with different settings of the regulating means.

The extremely reliable adjustability of our device when used with "Fluothane" is illustrated by the curves of Fig. 9. In this graph the abscissae represent the settings of drum 18 having 40 equally spaced graduations on its periphery indicating progressively a nominal content of from 0 to 5 percent "Fluothane" vapor in the outlet gas; the ordinates represent the percentages of vapor actually found corresponding to the dial settings.

The heavy curve 36 is a plot of values for a gas flow of 4 liters per minute and light curve 37 gives values for a flow of 8 liters per minute. It will be seen that at the slower flow, 4 liters per minute, the actual vapor concentration is within 0.1 percent of the indicated amounts for all drum readings. At 8 liters per minute, the actual concentration is slightly higher than that indicated at values above 0.6 percent, the maximum difference being +0.8 percent at a drum reading of 2.0 percent. Our device is thus capable of extremely close control in the useable range of vapor concentration for anesthesia (approximately 0.5–4.0 percent for "Fluothane").

Figure 10:
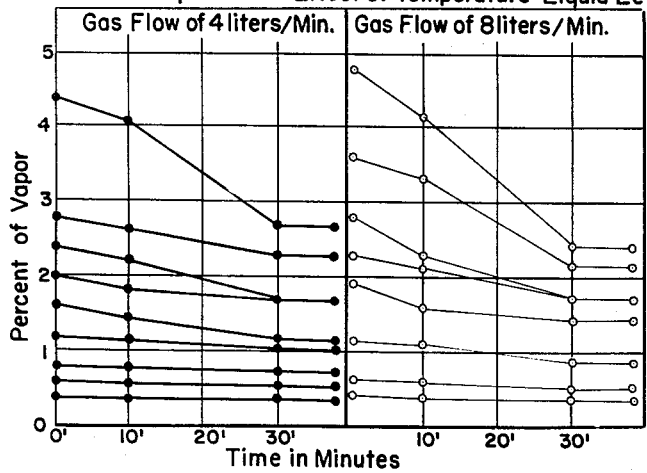
Fig. 10 is a set of graphs illustrating the effect of temperature on vapor delivery from our vaporizer.

In Fig. 10 the effect of continuous operation of our device is shown. The left hand set of curves illustrates concentrations at a gas flow of 4 liters per minute and the right hand set at 8 liters per minute. The abscissae represent duration of flow in minutes and the ordinates represent the vapor concentrations, the O' ordinate being the setting of dial 18, which was unchanged during each run. The determinations were made at a constant room temperature of approximately 21° C., but continued evaporation of the anesthetic caused the liquid temperature in container 1 to drop. The effect of this is shown in the descending slope of the curves for concentrations of 2 percent or more for the first 20–30 minutes, but it is to be noted that for all conditions the curves level off at 30 minutes so that a constant concentration is maintained thereafter.

While our vaporizer has been disclosed as especially adapted for use with volatile liquid anesthetics, it is by no means limited to this use. It may, for example, be employed in other situations where it is desired to distribute a controlled amount of vapor of a volatile liquid other than an anesthetic in a gas stream, or even, with an absorbent in the jar, where it is desired to remove a controlled amount of vapor from a gas stream. It appears primarily suited for laboratory use in such situations.

We claim:

1. A vapor-exchange device comprising a jar, a vapor-tight cap on the jar, a valve chamber on the cap, a cover on the valve chamber, a first inlet duct leading from the exterior into the valve chamber, a first outlet duct leading from the valve chamber to the exterior, a second inlet duct leading from the valve chamber into the jar, a second outlet duct leading from the jar into the valve chamber, a proportioning valve in the valve chamber adapted to regulate and proportion the flow of gas through the first and second ducts, and adjusting means operable from the exterior to position the proportioning valve, the valve chamber having a floor a portion of which is flat and lies in a plane transverse to said second inlet and outlet ducts, and said proportioning valve having an element slideable on and in contact with the flat portion of the valve chamber floor in directions transverse to the said second inlet and outlet ducts and being adapted to regulate simultaneously the vapor flow between said first and second inlet ducts and said first and second outlet ducts.

2. A vapor-exchange device according to claim 1 in which the second inlet duct is extended by a nipple part way into the jar.

3. A vapor-exchange device according to claim 2 in which the nipple extending into the jar is further extended by a tube telescoping with the nipple with an easy slide fit, the tube being supported by a float spaced at a fixed distance below the bottom of the tube, the float being adapted to maintain the bottom of the tube a constant distance above the surface of a liquid contained in the jar.

4. A vapor-exchange device according to claim 1 in which the valve adjusting means comprises a rack on the slide valve meshing with a pinion fixed on a rotatable arbor extending from the valve to the exterior.

5. A vapor-exchange device according to claim 1 in which the slide valve is a flat plate slideable on its edge in a groove in the floor of the valve chamber, provided with a window in its midportion and adapted in one extreme position to isolate said second ducts from gas passing through said first ducts and in its other extreme position to isolate said first inlet duct from said first outlet duct, but to permit gas flow through said second ducts.

6. A vapor-exchange device according to claim 5 in which at least one J-shaped baffle is so positioned adjacent the inlet side of the window in the slide valve as to collect and direct a portion of the gas stream entering the valve chamber to and through said window whereby alteration of the proportioning effect of the valve may be effected by altering the curvature of the baffle.

7. A vapor-exchange device according to claim 1 in which the slide valve comprises two flat plates joined to form a T having a crosspiece and a shank, the shank of the valve being slideable in a groove in the floor of the valve chamber and adapted to isolate said second ducts from each other in both retracted and extended position and additionally to isolate said first ducts from each other in extended position, the crosspiece in retracted position being adapted to isolate said first ducts from said second ducts.

8. In an anesthetic vaporizer having a jar adapted to contain a volatile liquid anesthetic, a vapor-tight cap on the jar, a valve chamber on the cap, a first inlet duct leading from the exterior into the valve chamber, a first outlet duct leading from the valve chamber to the exterior, a second inlet duct leading from the valve chamber into the jar, and a second outlet duct leading from the jar into the valve chamber, the improvement which comprises: a proportioning slide valve having a straight bottom edge portion adapted to slide lengthwise in a groove, a groove in the bottom of the valve chamber accommodating the straight bottom edge portion of the valve, extending between the openings into the valve chamber of said second ducts and long enough to permit slideable displacement of the valve, and regulating means operable from the exterior of the valve chamber to position the slide valve, said valve being provided with means in one extreme position to direct a flow of gas from the first inlet duct through the valve chamber to the first outlet duct, and in its other extreme position to direct a flow of gas from the first inlet duct through the second inlet and outlet ducts to the first outlet duct.

References Cited in the file of this patent

UNITED STATES PATENTS

| | | |
|---|---|---|
| 2,136,245 | Heidbrink | Nov. 8, 1938 |
| 2,866,455 | De La Torre | Dec. 30, 1958 |

FOREIGN PATENTS

| | | |
|---|---|---|
| 242,553 | Great Britain | Nov. 12, 1925 |
| 181,355 | Austria | Mar. 10, 1955 |